United States Patent
Colding-Kristensen et al.

(10) Patent No.: US 7,823,409 B2
(45) Date of Patent: Nov. 2, 2010

(54) FREEZING SYSTEM

(75) Inventors: Holger Colding-Kristensen, Hals (DK); Frank Hellström, Helsingborg (SE)

(73) Assignee: Scanico A/S, Aalborg SØ (DK)

( * ) Notice: Subject to any disclaimer, the term of this patent is extended or adjusted under 35 U.S.C. 154(b) by 595 days.

(21) Appl. No.: 11/628,927

(22) PCT Filed: Jun. 7, 2005

(86) PCT No.: PCT/DK2005/000376
§ 371 (c)(1), (2), (4) Date: Dec. 22, 2006

(87) PCT Pub. No.: WO2005/121666
PCT Pub. Date: Dec. 22, 2005

(65) Prior Publication Data
US 2008/0196438 A1 Aug. 21, 2008

(30) Foreign Application Priority Data
Jun. 7, 2004 (DK) .............................. 2004 00889

(51) Int. Cl.
*F25D 25/04* (2006.01)
(52) U.S. Cl. ..................................... 62/380
(58) Field of Classification Search .............. 62/63, 62/380, 374
See application file for complete search history.

(56) References Cited

U.S. PATENT DOCUMENTS

| | | | | |
|---|---|---|---|---|
| 3,393,532 | A | * | 7/1968 | Khoylian ............... 62/380 |
| 3,455,120 | A | | 7/1969 | Schlemmer |
| 3,778,907 | A | * | 12/1973 | Kuntz et al. ............ 34/580 |
| 4,576,090 | A | | 3/1986 | Burtea |
| 4,858,445 | A | * | 8/1989 | Rasovich ............... 62/374 |
| 5,396,716 | A | | 3/1995 | Smart et al. |
| 6,146,678 | A | | 11/2000 | Caridis et al. |
| 6,557,367 | B1 | * | 5/2003 | Lang et al. ............. 62/380 |
| 2006/0090497 | A1 | * | 5/2006 | Ishikura et al. ........ 62/380 |

FOREIGN PATENT DOCUMENTS

| | | |
|---|---|---|
| EP | 0089762 | 9/1983 |
| JP | 2001/120243 | 5/2001 |
| JP | 2001120243 A * | 5/2001 |

* cited by examiner

*Primary Examiner*—Frantz F. Jules
*Assistant Examiner*—Emmanuel Duke
(74) *Attorney, Agent, or Firm*—James Creighton Wray; Meera P. Narasimhan (57) ABSTRACT

A freezer housing for a freezer for cooling and/or freezing of products lying on a conveyor belt, and which are conveyed through a freezing zone for the freezing, where upper ejector plates are provided above the conveyor belt and lower ejector plates are provided below the conveyor belt for inflow of air into the freezing zone while applying an impingement principle, where the ejector plates are provided with transverse air return ducts.

15 Claims, 8 Drawing Sheets

FREEZING SYSTEM

This application claims the benefit of Danish Application No. PA 2004 00889 filed Jun. 7, 2004 and PCT/DK2005/000376 filed Jun. 7, 2005, which are hereby incorporated by reference in their entirety.

BACKGROUND OF THE INVENTION

The present invention concerns a freezer for cooling and/or freezing of products lying on a conveyor belt, and which are conveyed through a freezing zone for the freezing where upper ejector plates are provided above the conveyor belt and lower ejector plates are provided below the conveyor belt for inflow of air into the freezing zone while applying an impingement principle. A freezer according to the invention may be used in combination with a closed, thermally insulated housing.

The present invention furthermore concerns an ejector plate for a freezer for cooling and/or freezing of products lying on a conveyor belt, and which are conveyed through a freezing zone for the freezing, where upper ejector plates are provided above the conveyor belt and lower ejector plates are provided below the conveyor belt for inflow of air into the freezing zone by using the so-called impingement principle.

An example of a freezer using impingement-technique is known from JP 2001-120243 A. In this freezer, ejector action is applied which is produced by longitudinal slots that extend cross-wise of the conveyor belt on which the products are disposed. These slots cannot be said to constitute an ejector plate, and between the ejector slots there are provided transverse ducts enabling return of the injected air.

The products that are frozen will primarily be products of relatively limited size, such as burgers, fish fillets, rissoles or similar, placed loosely on a conveyor belt. However, the invention is not limited to such products, as the impingement principle may also be used for thick products.

The conveyor belt is moving through the freezing zone where above it as well as below it ejector plates are provided and which are furnished with holes. These holes typically have some extent and may be tubular so that the air is injected with orientation largely perpendicularly to the surface of the belt. An inflow of air to the freezing zone, impinging on the products, is hereby obtained. By using these ejector nozzles instead of inflow apertures in plates above and below the freezing zone it is avoided that the air flows in parallel with the conveyor belt and leaves the belt laterally. If this happens, there is risk of the products being blown down from the belt due to the applied air speeds.

The impingement technology is based on a very high airspeed. Thus airspeeds up to 40 m/s may be operated with by injection in against the product. Hereby is achieved a very efficient breaking of the air layer around the product so that a great freezing efficiency is attained.

With the present invention, it is aimed at achieving an improvement of existing technology and increasing the freezing capacity by combining the impingement principle with traditional air cooling while simultaneously making the freezer easy to clean.

According to the present invention, this is achieved with a freezer of the kind indicated in the introduction, which is peculiar in that the ejector plates are provided with transverse return air ducts with orifices disposed in a plane for the ejector plates and facing the conveyor belt, and that the return air ducts are arranged so that return air, at least partly, is conducted transversely to the conveying direction of the conveyor belt through the freezing zone in areas in immediate vicinity of the conveyor belt.

The ejector plate according to the invention is peculiar in that it is provided with transverse return air ducts with orifices disposed in a plane for the ejector plate and facing the conveyor belt, and that the return air ducts are arranged so that return air, at least partly, is conducted transversely to the conveying direction of the conveyor belt through the freezing zone in areas in immediate vicinity of the conveyor belt.

The freezing system according to the invention includes a freezer located in a closed thermally insulated housing. As mentioned, the freezer includes a conveyor belt upon which the products are placed, and which is disposed between two perforated ejector plates. Furthermore, the freezer has a system of blowers providing air to be circulated through the ejector plates, past the product and then to exhaust ducts. The exhaust ducts from the freezing zone are connected to a heat exchanger/evaporator where the air is cooled for subsequent recirculation via the blower back to the injection side of the ejector plates.

We are thus speaking of a plant where air is circulating inside a thermally insulated housing where a low temperature is present, which e.g. may be down to −40° C. or even lower. Inside the housing, a differential pressure exists at each side of the blower and thereby also at each side of the freezing zone.

Prior art freezers have a large volume, and thus it is not uncommon that the width of the freezer housing is 3 meters or more, with a height of 2 meters or more. The length and width of the freezer housing depends on the needed capacity. According to the present invention, a freezer housing will be made with sectional division, where each section can be 3, 4 or 5 meters long, and where these sections may be combined to a given number determined by customer requirements.

By making a freezer according to the invention it is preferred that heat exchanger/evaporator is disposed at a position immediately under the conveyor belt. The air coming from discharge ducts at one or the other side of the freezing zone will hereby flow down and pass through the evaporator and be sucked out through a blower which preferably will be disposed at a position which is juxtaposed to the evaporator. The blower will then blow air upwards to an injection compartment which is disposed above and below the upper and lower ejector plates, respectively.

The blower is driven by a motor which may be disposed optionally at the inner side or at the outer side of the housing. Heat may hereby be given off by the motor outside the insulated housing. Harmful influence on the temperature inside the housing is hereby avoided. Furthermore, disposition outside the housing itself will contribute to greater serviceability, as easy access to the motor is provided.

Generally, a freezer housing will be made so that a sidewall may be opened in order to provide free access to the side of the conveyor belt. The opening sidewall in a freezer housing according to the invention will preferably be the side where the electric motor is disposed.

Air, which is conducted into the freezing zone from above and from below, will traditionally be conducted directly downwards through discharge slots which are largely vertically oriented. In principle, this means that the air, after having impinged on a product on the conveyor belt in the freezing zone, is conducted directly out from the freezing zone. This passing out/discharge of air is also provided in order to avoid the above problem of blowing the products off the conveyor belt.

With a freezer system according to the present invention, a greater efficiency and better utilisation of the cooling capacity in the air blown into the freezing zone is desired. This may be achieved by providing longer time of contact between the air and the products.

This has hitherto been difficult due to the risk of blowing the products off the conveyor belt.

According to the present invention, the ejector plates above and below the conveyor belt are provided with transverse return air ducts. These ducts have a cross-section which may be polygonal or curving, e.g. triangular, four-edged, pentagonal or have semi-circular shape or other curved shape. A freezer or an ejector plate according to the invention may preferably have return air ducts which are peculiar in that they are largely triangular and are oriented with a corner towards the conveyor belt, that each corner is cut off so that no acute angles between adjacent wall parts are formed, and that the return air ducts are connected with the ejector plates via short wall parts which are largely perpendicular to the plane of the ejector plates.

The return air ducts thus appear with their triangular cross-section oriented towards the plane where the perforated zone of the ejector plates is located. The return air ducts thus have a relative narrow stem which is formed by the short wall part running perpendicularly to the ejector plates.

The shape of the return air ducts is thus primarily based on a narrower mouth and a wider duct. With such a shape it will be possible to return air without too large counterpressure occurring in the return air duct.

In order that small products are not blown away from the conveyor belt, return air ducts will primarily be dimensioned so that a transverse airspeed of about 10 m/s is attained, which is to be compared with the airspeed of about 40 m/s in the impingement area. With return air ducts having a wider duct bottom than mouth, a largely mushroom-shaped cross-section may be used as alternative to the triangular shape. With this shape, a need for relatively large return air ducts is provided for, reducing the pressure drop and thereby also enabling reduction of the need of large blowers and thereby the energy demand. Furthermore, by using the largely triangular cross-sectional shape or the mushroom shape, it will be possible to reduce the installation height compared with a rectilinear cross-sectional shape of the return air duct.

Furthermore, it is to be provided that the impingement zone, i.e. the part of the plate with perforated holes, is to be relatively large compared with the area for the return air. The return air ducts are therefore made with relatively narrow width with the mouth in the perforated plate. If the return air ducts had triangular shape with rectilinear course in direction against the holes in the ejector plate, inferior flow conditions would occur in the border areas close to the return air ducts, and thereby insufficient airspeed for achieving an efficient impingement effect.

By using the short wall parts extending up from the perforated plate, it appears that good flow conditions are achieved in immediate association with the mouth of the return air ducts, so that an efficient impingement effect also occurs by the air injected in the openings situated in the edge area adjacent to the mouth of the return air ducts. The transverse ducts enable the air to flow transversely of the moving direction of the conveyor belt. As ejector plates are traditionally disposed very close to the underside of the conveyor belt and at a position immediately above the top side of the products to be passed through the freezing zone, the mouths of the return air ducts will be in close contact with the top side of the product and the underside of the conveyor belt, respectively.

A cross-wise air sweeping by the return air is thus effected which may produce an additional cooling effect.

It may thus be said that the freezing system according to the present invention involves a method where the air is conducted through the freezer by a combination of airflow perpendicularly to the path of the products through the freezer, and a flow in parallel with the course of the products through the freezing zone with orientation perpendicularly to the conveying direction of the products.

By such a method, extended contact time between the air and the products is attained, whereby a more efficient cooling is obtained.

By the present invention, ejector plates with a hole pattern are provided. Ejector plates with hole pattern cover 70% or more of the area over the conveyor belt on which the products are placed. The return air ducts will cover up to 30% of the area and typically a considerably lesser part, e.g. down to 20-28% of the area over the conveyor belt on which the products are placed. It may thus be said that in a freezer sections, impingement plates, are formed, between which there are sections for return air ducts.

As the return air ducts have a mouth located in the plane of the ejector plates and facing the conveyor belt, the return air, or at least part of the return air, will be conducted in a transverse movement in relation to the direction of movement of the conveyor belt. By this transverse movement, the still cold air will sweep the products situated on the conveyor belt between a set of ejector plates. The products will thus be cooled by the impingement principle in combination with a subsequent heat transmission by means of the air sweeping in the return air ducts.

Based on a power calculation in a cooling plant having a normal airspeed of 3 m/s across the product, and setting this as index 100 for the freezing efficiency, an increased airspeed of 8-10 m/s across the product will then entail an efficiency with an index of about 120. If impingement technology is used instead, operating with airspeeds of 30-40 m/s, the index for the freezing efficiency will be between 300 and 400, typically about 350.

With a freezer according to the present invention, where about 70% of an area is covered by ejector plates, and about 30% is covered by return air ducts, typically there is dimensioned for an average airspeed of about 10 m/s in the return air ducts. With basis in the above calculation, about 13% higher efficiency may be attained compared with a freezer with ejector plates which do not enable utilisation of the return air for additional cooling.

By designing the return air ducts with largely triangular cross-section where the corners are cut off, or a largely mushroom-shaped cross-section, it is possible to avoid sharp corners that are easy to clean.

By terminating the outermost corners of the triangular cross-section of the return air ducts with short wall parts, obtuse angles will appear which will contribute substantially to easy cleaning of the freezer.

Usually, the major part of the injection air passed through the ejector plats will come up from one side, normally the top side. According to the invention, there will be provided the same number of return air ducts on both sides of the conveyor belt. This ensures a more efficient airflow through the freezer, and at the same time ensures that a transverse airflow is established, improving the efficiency.

It is preferred that the return air ducts have increasing cross-section in direction of the airflow for establishing a largely uniform airspeed across the return air ducts.

It is preferred that return air ducts in the upper and lower ejector plate will usually be disposed opposite each other so that return ducts are situated immediately opposite each other at each side of the conveyor belt. Hereby is avoided the risk of light products being blown away from the conveyor belt by the impinging air.

The return air ducts are dimensioned so that it is possible that the cold injection air coming from the pressure zone can be passed through the evaporator/heat exchanger without too large counterpressure occurring in the system.

A hole pattern will be formed in the ejector plates. The hole pattern may be formed in relatively thick plates in order to form the above mentioned ejector nozzles, or alternatively tubular stubs may be formed, ensuring perpendicular orientation of the airstream relative to the products for establishing the impingement effect.

In order to achieve even distribution of the impingement effect across the entire width of the conveyor belt and thereby evenly distributed across the products disposed on the conveyor belt, it is preferred that the hole pattern is disposed with apertures that are oriented obliquely in relation to the conveying direction of the products or in other ways mutually displaced as seen in the direction of movement of the conveyor belt. Furthermore, it is preferred that the openings are staggered so that subsequent to passage through the freezing zone the products have been imparted an even impingement action over the entire width of the conveyor belt, and thereby also across the entire width of product.

The perforation or hole pattern may be staggered by disposing the apertures obliquely in relation to the direction of transport of the conveyor belt. However, it has also appeared possible to achieve a more even distribution of the impingement action across the entire width of the conveyor belt when it is only ensured that succeeding apertures in the conveying direction of the conveyor belt are displaced in the transverse direction of the conveyor belt with a spacing that approximately corresponds to half their diameter when operating with round impingement apertures.

With a hole diameter of 6 mm, the displacement of succeeding apertures will thus be 3.75 mm.

In the freezing housing there is a plate arrangement that divides the housing into a pressurised zone between the evaporator, the heat exchangers and the injection side of the ejector plates, and a second zone with lower pressure where the air flows out from the return air ducts and flows to the inlet side of the heat exchanger/evaporator. It is preferred that this plate arrangement is suspended on vertical rods (columns) or a support holder beam, so that the plate arrangement may be pivoted away from its normal position in case of cleaning. Hereby is achieved a cleaning-friendly construction.

It is preferred that the support holder beam is a longitudinal support holder beam which is disposed in the longitudinal direction of the machine at a position opposite to the conveyor belt. Furthermore, it is preferred that the support holder beam is suspended pivotably, at least at its top side, but alternatively also at its underside. The plate structure and possibly also the conveyor belt may hereby be mounted on the support holder beam and be pivoted away from their normal position to a service position, where easy access is enabled for the purpose of cleaning the components of the system. At the inner side of the housing, the plate arrangement will bear against contact faces that are secured at the inner side of the housing for providing an airtight joint between the two pressure zones of the housing. It is preferred that the plate is disposed at one side of the contact face facing the overpressure zone of the housing. The overpressure will hereby contribute to press the plate against the contact face. By using suitable sealing material on the contact surface in the housing and the contact face in the plate construction, efficient sealing is ensured so that the air may only flow from one zone to the other through the ejector nozzles of the ejector plates.

It is possible to swing the entire plate construction together with the conveyor belt clear, or, alternatively, the plate construction may be divided so that only a part of the plate construction is swung clear of the conveyor belt, which remains in fixed position during the cleaning.

In a freezer according to the invention it is preferred that the return run of the conveyor belt is provided in a separate tunnel in the housing. A separate pressure zone is hereby formed which communicate with the surroundings. Hereby is provided least possible exchange of air in the housing with air from the surroundings, facilitating obtention of the best possible air balance in the housing of the freezer. Furthermore, this will also entail that requirements for sealing lead-in openings in the housing for the return run of the conveyor belt are minimised.

In the pressure zone in the housing where the cooling air is passing, there will be a leakage risk at the passage openings for the run of the conveyor belt on which the products are placed. In order to reduce the risk of air flowing out through the passage openings of the belt from the pressurised housing to the surroundings, it is preferred that a return air duct is formed adjacent to the wall of the housing, and which is made with such size that the airspeed in the opening area with the passage openings of the housing becomes 2-5 m/s. This will provide that there is very little risk of air flowing out of the housing.

A freezer according to the invention will preferably be divided into sections, so that on very long units a series of freezing sections as mentioned above are used. With such sectional division it will be possible to perform disconnecting of heat exchanger/evaporator in order to obtain defrosting. As heat exchanger/evaporator is disposed under the conveyor belt, there will be no need for a construction for draining off water from the defrosting around the products on the conveyor belt. The water may in a simple way be led out on the water to a drain. Furthermore, it is advantageous to dispose heat exchanger/evaporator under the conveyor belt, as less demands to the dimensioning of the freezer are made hereby, compared with traditional freezers where heat exchangers/evaporators are mounted on machine frames at a position above the conveyor belt. The construction will thus facilitate cleaning and provide the advantage that partial defrosting may occur in long units while these are operating.

The invention will now be explained more closely in the following with reference to the accompanying schematic drawing, where.

DETAILED DESCRIPTION OF THE PREFERRED EMBODIMENTS

Figure 1:
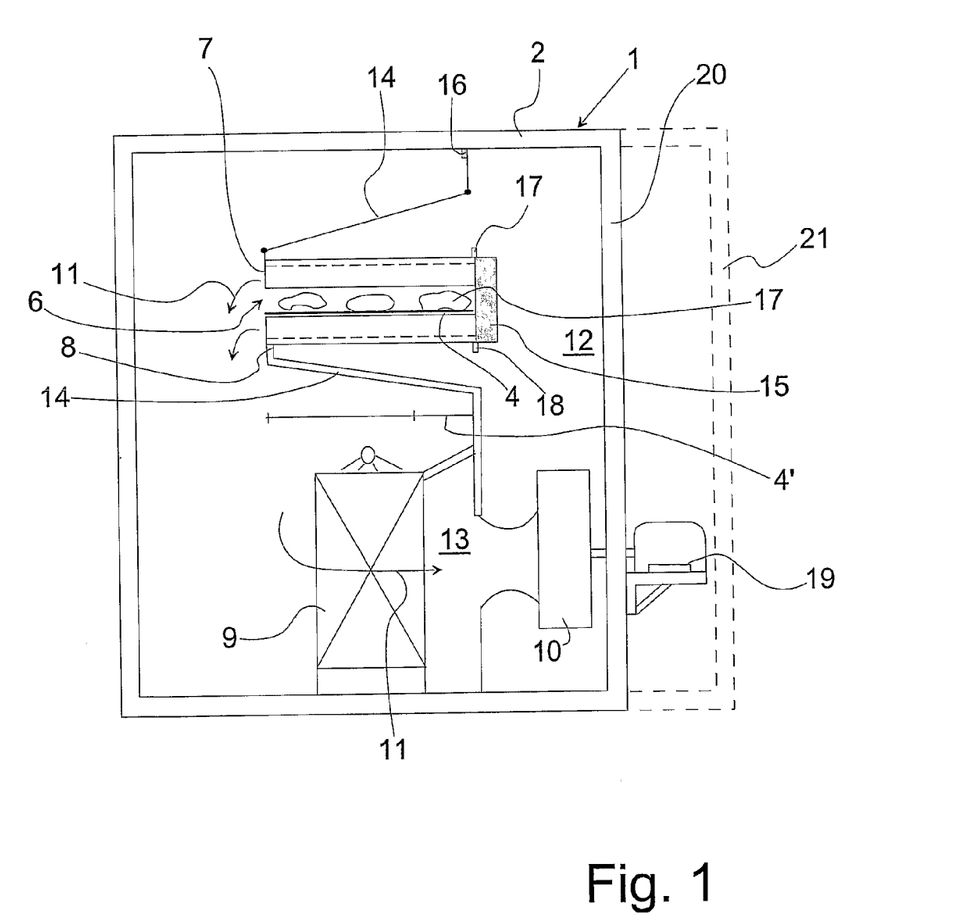
FIG. 1 shows a cross-section through a freezer housing for illustrating the most important parts forming part of the system.

A housing 1 with an insulated wall 2 contains a conveyor belt 3 having an upper run 4 on which products 5 are placed, and a lower return run 4'. The upper run 4 and the products are situated in a freezing zone 6 between an upper ejector plate 7 and a lower ejector plate 8. The housing 1 includes a heat exchanger 9 and a blower 10. Air flows according to the arrow 11 through the system, and the housing thus has a pressure zone 12 where a larger pressure exists than in the pressure zone 13 of the housing. The pressure zones are divided by a plate arrangement 14. The conveyor belt and the plate arrangement 14 are suspended on a support holder beam 15, and the plate arrangement abuts on a contact surface indicated by 16. The support holder beam 15 is pivotably suspended as indicated by 17 and 18 at its top side and underside, respectively. Together with conveyor belt, ejector plates and plate arrangement, the support holder beam may be swung clear for the purpose of cleaning. As mentioned, as alternative to the support holder beam vertical rods (columns) may be used for the suspension of the plate construction.

A motor 19 driving the blower 10 is located outside the housing 1. The housing 1 has a sidewall 20 which alternatively may be disposed in the position 21 shown with broken lines.

Figure 2:
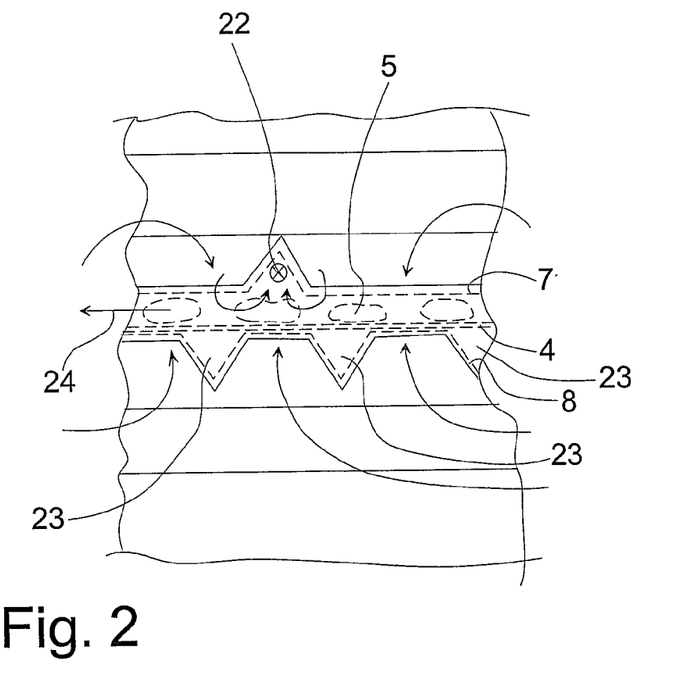
FIG. 2 shows a partial side view for illustrating the conveyor belt with ejector plates disposed above and below the conveyor belt on which products are placed.

FIG. 2 shows an enlarged view, on which appears that the upper and lower ejector plates 7, 8 are provided with return air ducts 22, 23 that enable air to flow in parallel with the upper run 4 of the conveyor belt transversely of the direction of conveying, which is indicated by arrow 24.

Figure 3:
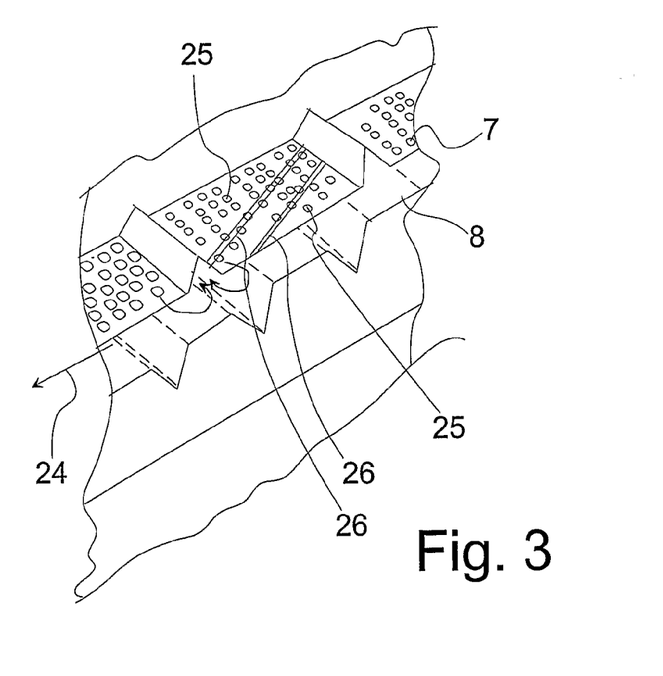
FIG. 3 shows a perspective view corresponding to FIG. 2 but where the conveyor belt and the products are omitted.

In FIG. 3 is seen that ejector plates 7, 8 are provided with apertures 25 which are oriented on lines indicated by 26 oriented at an angle in relation to the direction of conveying 24.

Figure 4:
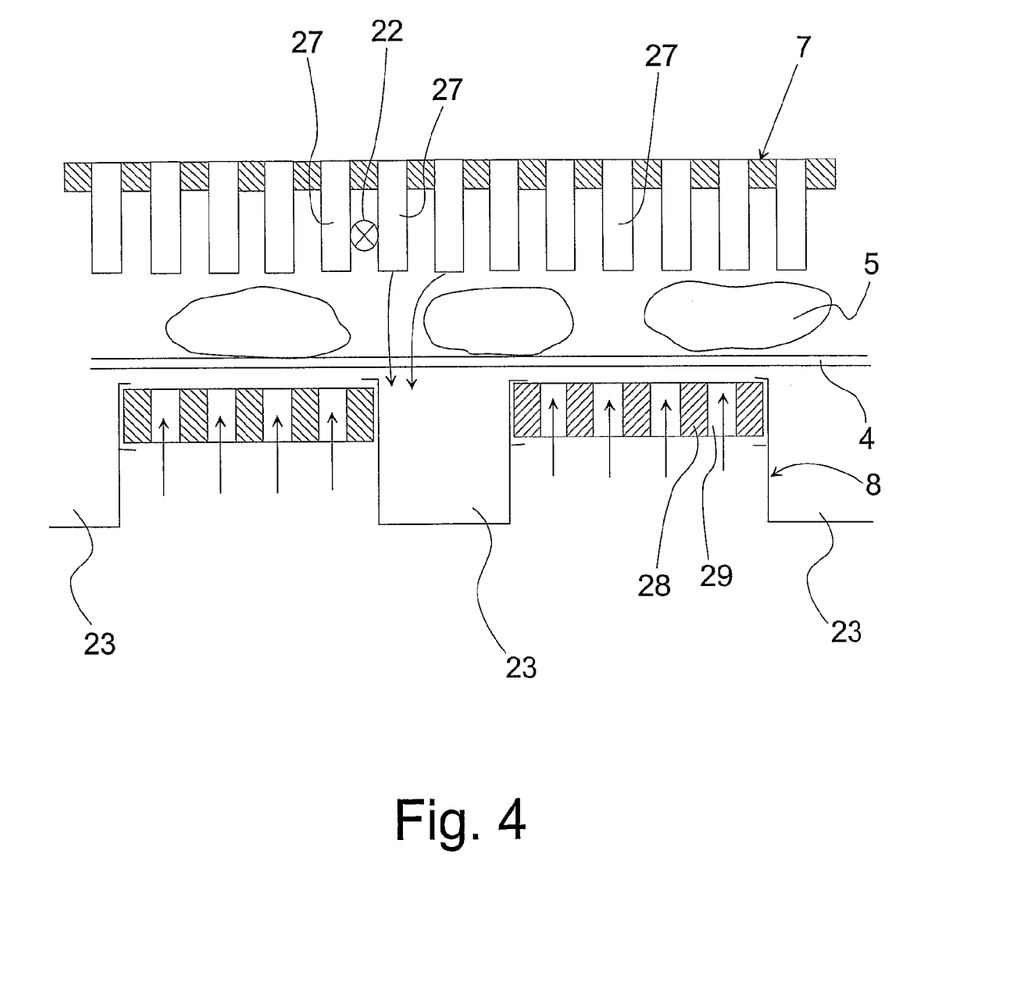
FIG. 4 shows a partial section of a second embodiment of a freezer for illustrating other possible embodiments of the ejector plates.

FIG. 4 illustrates an alternative embodiment. It appears that the upper ejector plate 7 is provided with pipe sections 27 forming the ejector nozzles. The lower ejector plate 8 is shown as a thick plate 28 with tubular holes 29 that form the ejector nozzles.

Furthermore, there is indicated a four-edged shaped return air duct 23 in the lower ejector plate 28. In the upper ejector plate there is illustrated a transverse return air duct 22 which is disposed between transverse rows of pipe sections 27. In FIG. 4 is only illustrated a return air duct 22 in the upper ejector plate and three return air ducts in the lower ejector plate 8. This illustrates that there are a larger number of return air ducts in the lower ejector plate than in the upper ejector plate.

Figure 5:
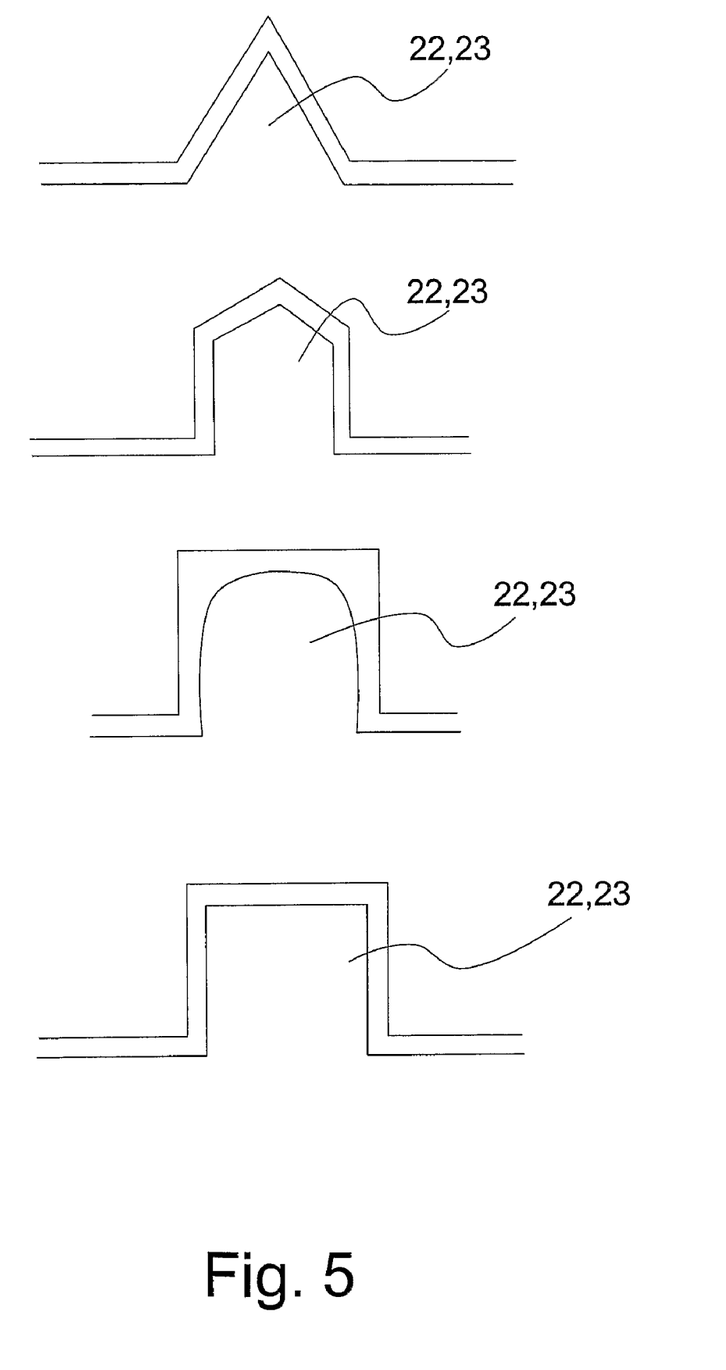
FIG. 5 shows different partial sections for illustrating alternative embodiments of the cross-section of the return air ducts in the ejector plates.

FIG. 5 shows various embodiments of cross-sections of the return air ducts 22, 23.

Figure 6:
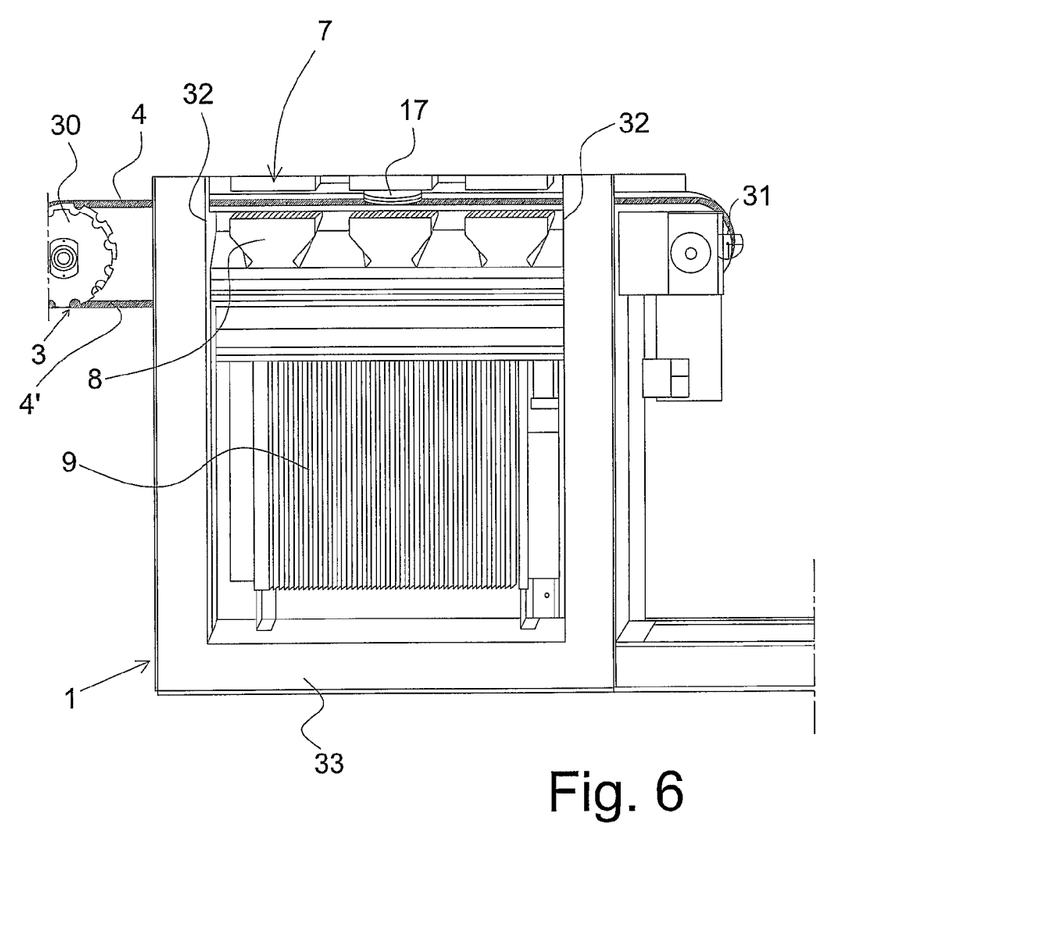
FIG. 6 shows a partial view of the principal structure of a single module for a freezer according to the invention.

FIG. 6 illustrates a single module, where a reversing roller 30 and a motor 31 for the conveyor belt 3 are shown for the sake of clarity. In practice, however, a reversing roller and a motor will not be provided for each module. However, in principle the module will be constructed as shown on the Figure, with partitionings 32 between the individual modules. These walls are typically constructed by plates which are not insulated. By this construction, it becomes possible to perform defrosting of a plant while in use. By defrosting, the blower 10 is stopped, and defrosting of the cooling-battery/heat exchanger 9 may be performed. This may be effected by hot gas and possibly water defrosting. Defrosting water will run down on a floor or a lower plate 33 and then to a drain. The production may thus proceed, and the upper run of the conveyor belt 4 with products placed thereon may pass through the module without being influenced during the defrosting.

Defrosting may be performed in several ways, e.g. as sequential defrosting with full production continuing, as sequential defrosting with limited capacity or by intermediate defrosting during interruption of production.

With such a system it will be possible to get considerably longer periods of operation and thereby lower production costs. As the defrosting may be performed concurrently, the need for cleaning by interruption of production will be reduced as well.

Figure 7:
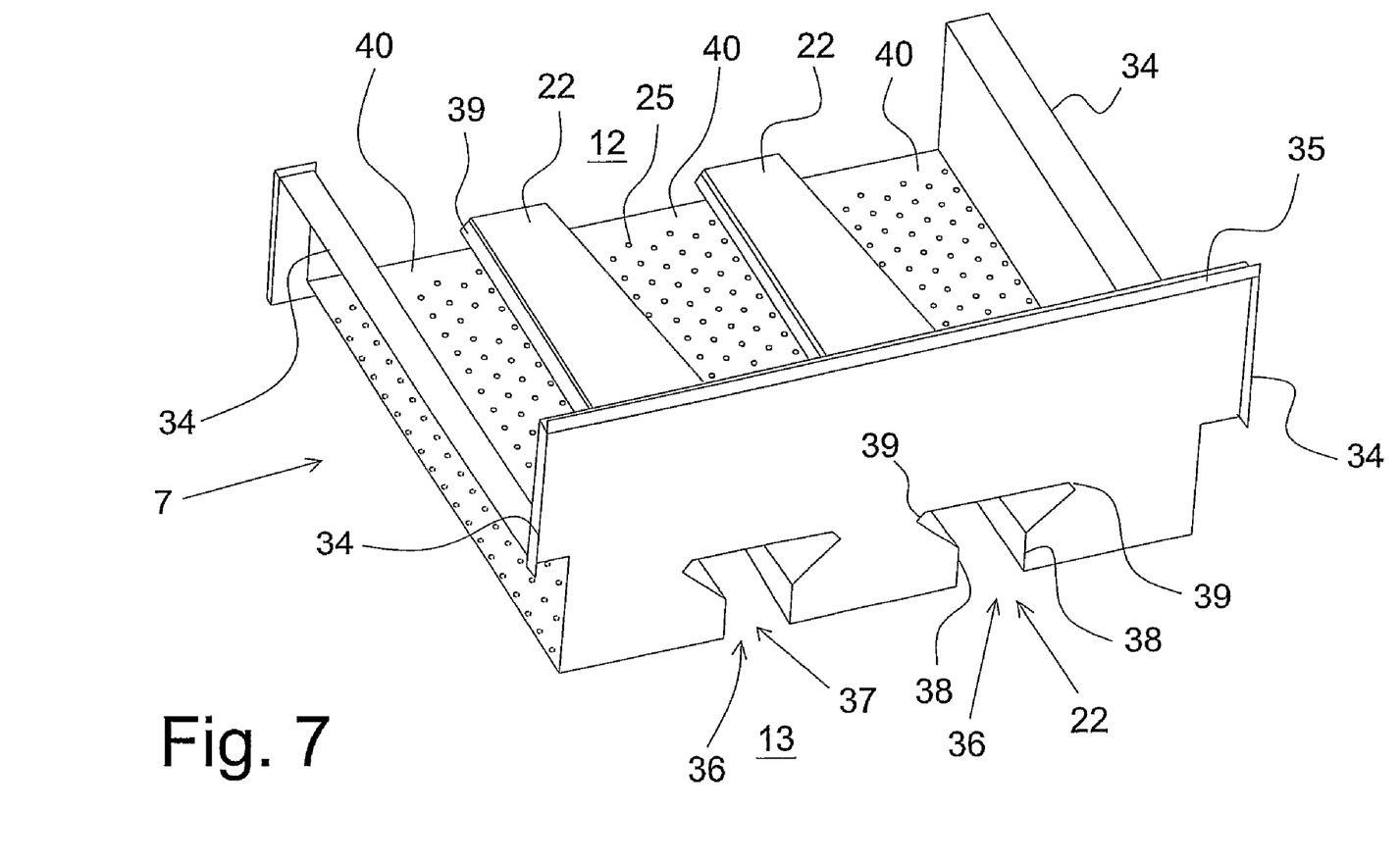
FIG. 7 shows a perspective view of an upper ejector plate for a module as shown in FIG. 6.

FIG. 7 shows an upper ejector plate 7 for use in the module shown in FIG. 6. The ejector plate has side faces 34 which will bear against and be in sealing contact with the partitionings 32 of the module. A side face 35 will thus be in sealing contact against an upper wall in the module. A tight fit is thus established, enabling division of the housing into pressure zones. The pressure zone 12, in which a larger pressure exists than in the pressure zone 13 of the housing, is indicated in FIG. 7.

In FIG. 7 is also seen that the return air ducts 22 have a cross-sectional shape that is largely triangular, or may be compared with a mushroom-shaped cross-section. It appears that the return air ducts 22 across the width of the conveyor belt have increasing cross-section towards their outlet opening, which is indicated by 36. The mouth 37 of the return air ducts facing the conveyor belt is delimited by short wall parts 38 that largely extend perpendicularly to the plane of the ejector plates. At the two upper corners of the triangular cross-section, there are also provided short wall parts 39 cutting off the corners. Thus the return air ducts 22 appear cleaning-friendly without any acute angles that may be difficult to clean.

Figure 8:
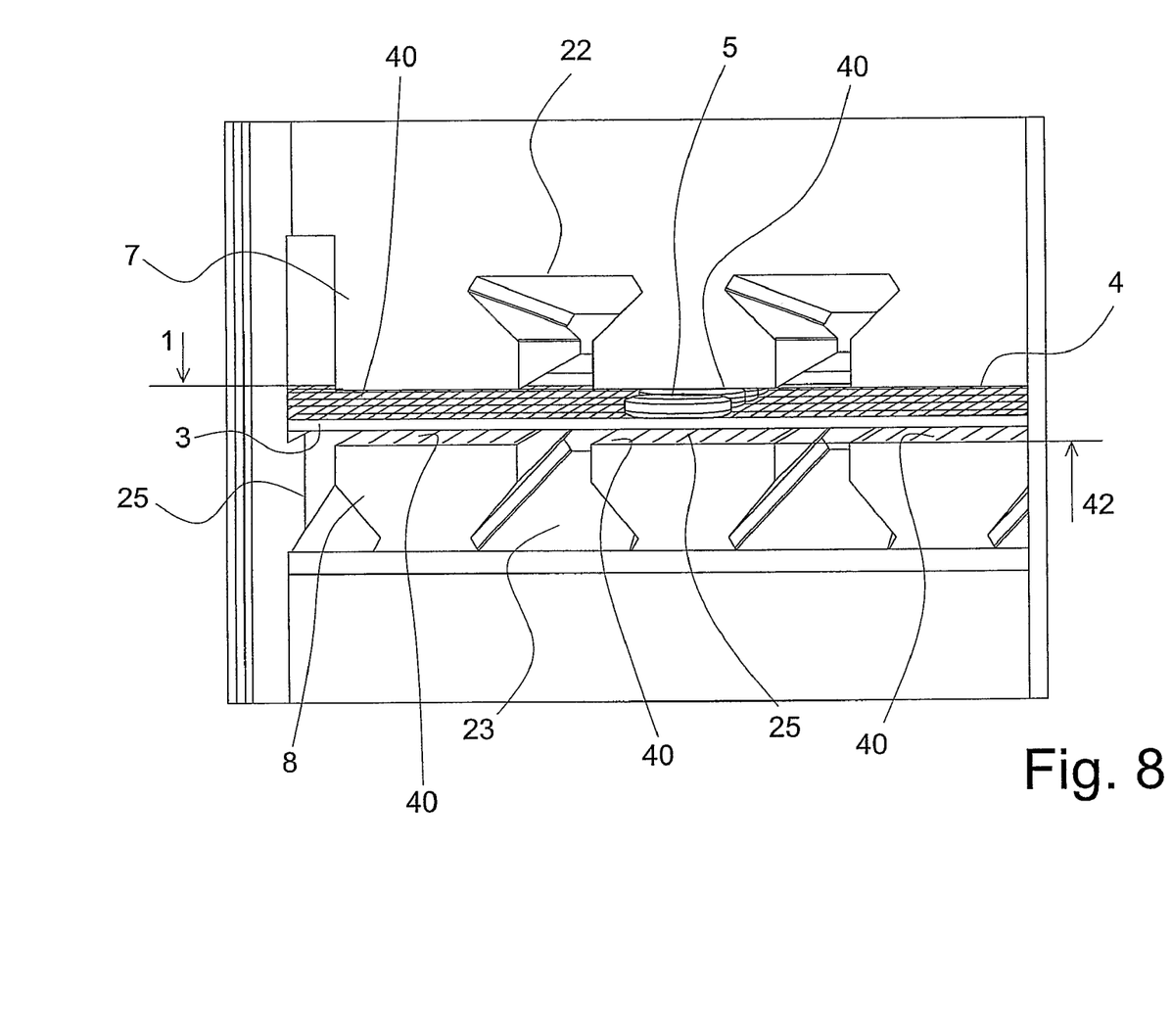
FIG. 8 shows a partial view for illustrating the upper and lower ejector plates in the module shown in FIG. 6, as seen from the low pressure side.

The return air ducts 23 provided in a lower ejector plate 8 appear more clearly from FIG. 8. It appears that return air ducts 23 have a shape corresponding to the shape of the return air ducts 22.

In FIG. 8 is seen that return air ducts 22, 23 are disposed opposite each other. Correspondingly, the zones 40 of the ejector plates provided with openings are also disposed opposite each other. It is also seen from FIG. 8 that the areas of the ejector plates provided with openings are disposed at a plane 41 and 42, respectively, which is located in immediate vicinity of the upper run 4 of the conveyor belt.

Figure 9:
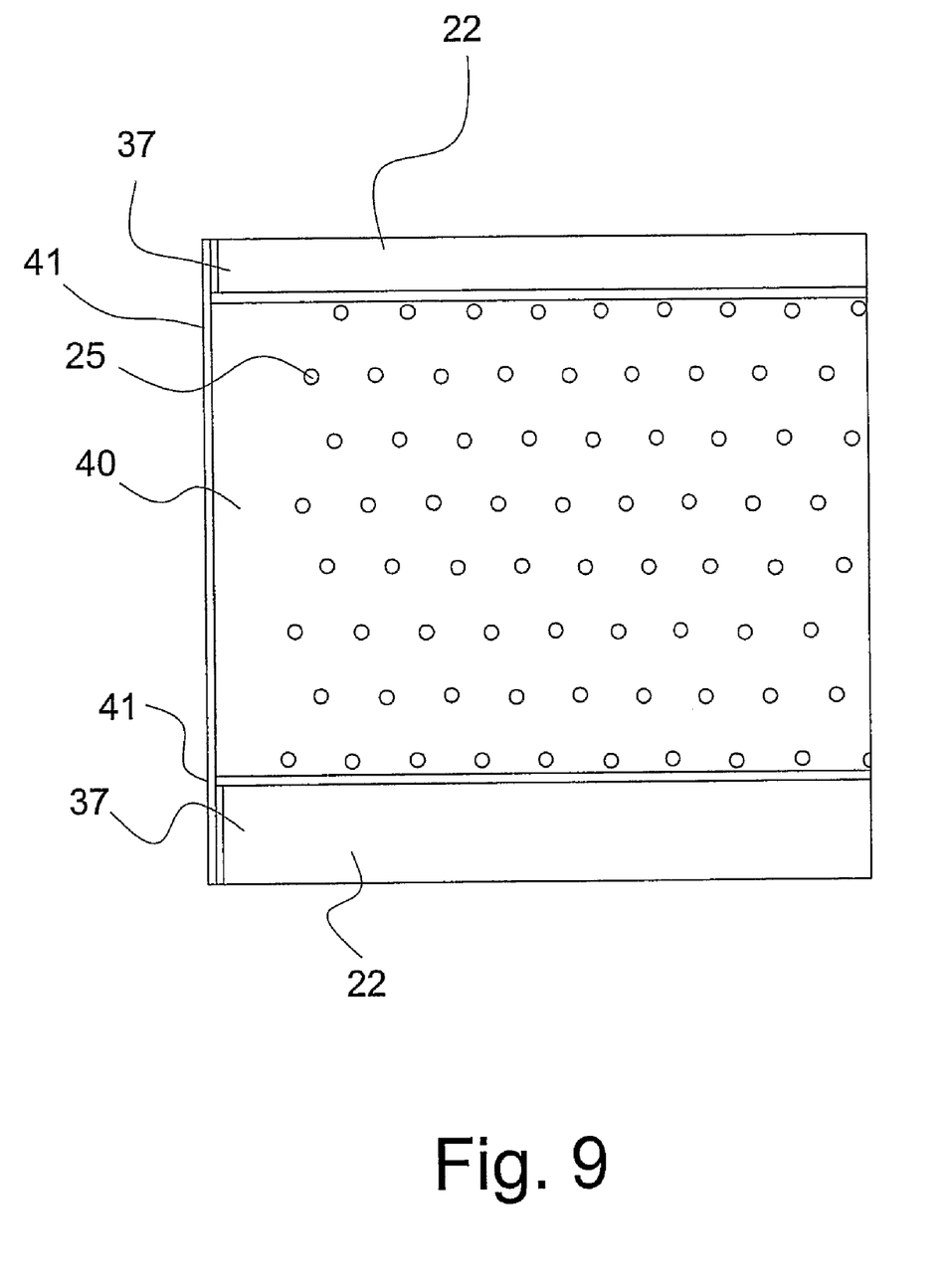
FIG. 9 shows a partial plan view of an ejector plate for illustrating staggering of the apertures in the ejector plate.

FIG. 9 shows a plan view of a zone 40 which is provided with impingement openings 25. From this appears that succeeding openings are mutually displaced. From FIG. 9 appears that impingement openings 25 are provided in edge areas 41 that are immediately adjacent to mouths 37 of the return air ducts. Thanks to the short wall parts 38 there will be provided an efficient impingement effect through the openings in these edge areas 41, even though it appears from the grey marking that the openings are covered by the underlying wider parts of the return air ducts 22.

The invention claimed is:

1. A freezer for cooling and/or freezing of products lying on a conveyor belt, and which are conveyed through a freezing zone for the freezing, where upper ejector plates are provided above the conveyor belt and lower ejector plates are provided below the conveyor belt for inflow of air into the freezing zone while applying an impingement principle, wherein each ejector plate comprises transverse return air ducts with orifices disposed in a plane of the ejector plates and facing the conveyor belt, and wherein the return air ducts are arranged so that return air, at least partly, is conducted transversely of a conveying direction of the conveyor belt through the freezing zone, and wherein each ejector plate comprises a hole pattern covering at least 70% of areas over the conveyor belt on which the products are placed, and wherein the return air ducts cover up to 30% of the areas over the conveyor belt on which the products are placed and wherein the return air ducts are arranged for conducting the return air transversely of a conveying direction of the conveyor belt in the areas in an immediate vicinity of the conveyor belt.

2. The freezer according to claim 1, characterized in that the return air ducts are triangular, four-edged, pentagonal, or semi-circular.

3. The freezer according to claim 1, characterized in that the return air ducts are largely triangular and are oriented with a corner towards the conveyor belt, that each corner is cut off so that no acute angles between adjacent wall parts are formed, and that the return air ducts are connected with the ejector plates via short wall parts which are largely perpendicular to the plane of the ejector plates.

4. The freezer according to claim 1, characterized in that the freezer is designed for injecting a major part of the injection air through the ejector plates at one side of the conveyor belt, and that a large number of return air ducts are provided on the ejector plates at the opposite side.

5. The freezer according to claim 1, characterized in that the return air ducts in the upper ejector plates are displaced in relation to the return air ducts in the lower ejector plates.

6. The freezer according to claim 1, characterized in that the return air ducts have increasing cross-section in direction of the airflow for establishing a largely uniform airspeed across the length of the return air ducts.

7. The freezer according to claim 1, characterized in that the freezer is configured to operate with airspeeds up to 40 m/s.

8. The freezer according to claim 1, characterized in that the freezer includes a heat exchanger/evaporator which is disposed at a position immediately under the conveyor belt.

9. The freezer according to claim 1, in combination with a closed, thermally insulated housing.

10. The freezer combined with the closed, thermally insulated housing according to claim 9, characterized in that the housing is configured to keep a temperature that may be down to minus 40° C., or below.

11. The freezer combined with the closed, thermally insulated housing according to claim 9, characterized in that the freezer includes a heat exchanger/evaporator, and that the freezing housing includes a plate arrangement that divides the housing into a pressurized zone between the evaporator, the heat exchangers and the injection side of the ejector plates, and a second zone with lower pressure where the air flows out from the return air ducts and flows to the inlet side of the heat exchanger/evaporator.

12. The freezer combined with the closed, thermally insulated housing according to claim 9, arrangement is suspended on vertical columns or a pivotably suspended support holder beam.

13. An ejector plate for a freezer for cooling and/or freezing of products lying on a conveyor belt, and which are conveyed through a freezing zone for the freezing, where upper ejector plates are provided above and below the conveyor belt for air inflow in the freezing zone by application of an impingement principle, wherein each ejector plate comprises transverse return air ducts with orifices disposed in a plane of the ejector plates and facing the conveyor belt, and wherein the return air ducts are arranged for conducting return air, at least partly, transversely of a conveying direction of the conveyor belt through the freezing zone, and wherein each ejector plate comprises a hole pattern covering at least 70% of areas over the conveyor belt on which the products are placed, and wherein the return air ducts cover up to 30% of the areas over the conveyor belt on which the products are placed and wherein the return air ducts are arranged for conducting return air transversely of the conveying direction of the conveyor belt in the areas in an immediate vicinity of the conveyor belt.

14. The ejector plate according to claim 13, characterized in that the return air ducts are largely triangular and are oriented with a corner towards the conveyor belt, that each corner is cut off so that no acute angles between adjacent wall parts are formed, and that the return air ducts are connected with the ejector plates via short wall parts which are largely perpendicular to the plane of the ejector plates.

15. The ejector plate according to claim 14, characterized in that the return air ducts have increasing cross-section in direction of the airflow for establishing a largely uniform airspeed over the length of the return air ducts.

* * * * *